July 5, 1960  TEIJI HASHIMOTO  2,943,532
SHUTTER RELEASING DEVICE FOR MOTION PICTURE CAMERAS
Filed Sept. 19, 1958

INVENTOR.
TEIJI HASHIMOTO
BY
ATTORNEY 2,943,532

SHUTTER RELEASING DEVICE FOR MOTION PICTURE CAMERAS

Teiji Hashimoto, Kawasaki City, Japan, assignor to Canon Camera Company, Inc., Tokyo, Japan, a corporation of Japan Filed Sept. 19, 1958, Ser. No. 762,018

1 Claim. (Cl. 88—16)

This invention relates to a shutter releasing device for motion picture cameras.

Many kinds of shutter release devices for motion picture cameras are presently on the market. One in which the release lever is depressed for continuous exposure and is lifted to make a single frame exposure, is very convenient to use. In making a single frame exposure for animated picture films or a title for a film, it was experienced that continuous exposures, instead of a single frame exposure, were made in error solely because no safety or foolproof means is provided on the shutter release lever. This invention provides an improved release device eliminating the possibility of such errors.

An object of this invention is to prevent the erroneous operation above described.

Another object is to provide a shutter release device of a simplified construction, which however, operates very reliably.

A clear concept of the scope and purpose of this invention may be obtained from the following description taken in connection with the attached drawing in which.

Figure 2:
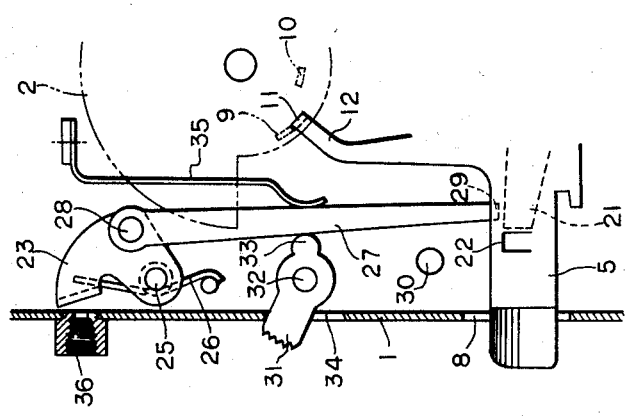
Figure 2 is an elevation of the same ready for single frame exposure.

Referring to the drawing, a shutter sector 2 is secured to a driving shaft which is driven by a spring motor not shown in the drawing and is supported by the camera frame. An aperture 4 is provided in the front wall of the camera through which the light from the photographing lens passes to the film behind shutter sector 2. A shutter release lever 5 is pivotally suported on pin 6 of the frame with its knurled free end 7 projecting through an aperture 8 defined in side wall 1 of the camera, for finger operation. Sector 2 is provided with two projections 9 and 10 to engage a stop 11 formed at the upper end of an arm arm 12 extending from release lever 5, when the latter is in an unoperated position. A bent ear 13 is formed adjacent to a transversely elongated aperture 14 provided at the midregion of the release lever, and a stub shaft 16 projects from front frame 15 of the camera. A hair pin spring 17 is snugly fitted to pivot 6 with forked ends 17' thereof embracing formed ear 13 and stub shaft 16 to hold release lever 5 in the position shown in Figure 1. An auxiliary lever 18 is pivotally supported on stub shaft 16, and a pin 19 affixed to its one free end engages a longitudinally elongated aperture 20 provided between aperture 14 and pivot 6 of release lever 5. The other end 21 of lever 18 extends toward a projection 22 formed on the release lever as shown in the drawing. A segment 23 having a bent-over end 24 is pivoted at 25 on front frame 15, and a spring 26 biases the segment counterclockwise in the usual manner. A long lever 27 is pivoted on the segment 23 by a pivot 28 with its lower end 29 extending toward projection 22 of release lever 5 when the long lever is pressed against a guide pin 30 by a spring 35 secured to the camera frame. A switch lever 31 having a boss 33 is pivoted by a shaft 32 on camera front wall 15 and its knurled end projects outside the camera side wall 1 through an elongated aperture 34 thereof. An internally taperingly threaded member 36 is attached to side wall 1 in alignment with bent-over end 24 of segment 23. A cable release may be threaded into member 36 as is well known.

Figure 1:
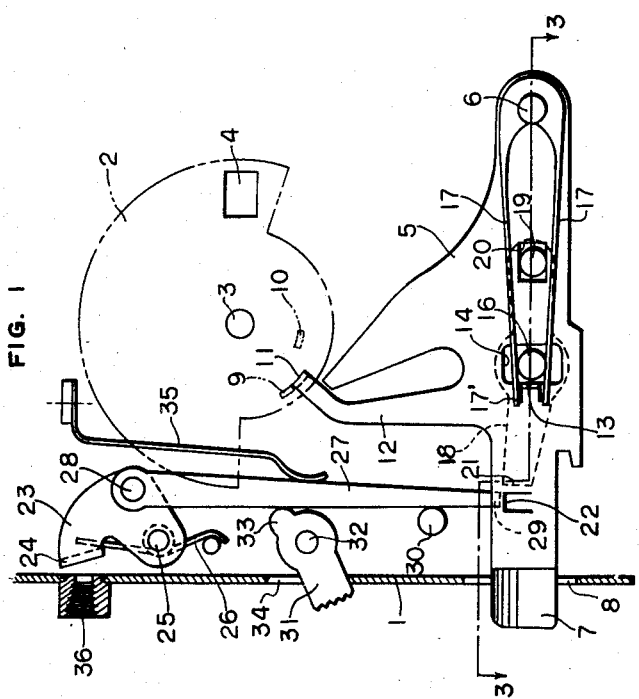
Figure 1 is a front elevation of a shutter releasing device for motion picture cameras according to the present invention ready for continuous exposure.
Figure 3:
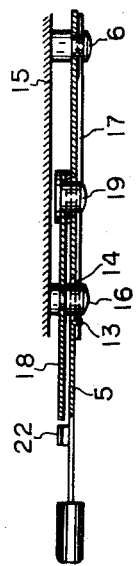
Figure 3 is a sectional view along the line 3—3 in Figure 1.

The operation of the device is as follows:

(1) *Continuous exposures.*—Figure 1 shows this case, in which the switch lever 31 is in its lower, continuous exposure position and elongated lever 27 is pressed on guide pin 30 by spring 35 to engage projection 22 of release lever 5. After tensioning of the motor spring in the usual manner, knurled end 7 of release lever 5 is depressed, thereby turning the release lever counterclockwise about pivot 6 and stop 11 on arm 12 disengages from projection 9 to rotate shutter sector 2 counterclockwise by means of the spring motor. The release lever 5 restores to the position shown in Figure 1 by means of hair pin 17 and ear 13 on the release lever, when the release lever is released. In this position of switch lever 31, the release lever can not lift up to make a single exposure, since lower end 29 of elongated lever 27 abuts upon projection 22 and segment 23 can not turn counterclockwise.

When a cable release or a delay action device of a prior known type is fitted in the taper screw of member 36 and is operated so that its spindle pushes bent-over end 24, segment 23 will turn clockwise around pivot 25. Thus the elongated lever 27 moves downward along guide pin 30 to push down projection 22, thereby release lever 5 is rotated downward to operate the shutter as in case of the above mentioned manual continuous exposure. When the releasing action of the cable release terminates segment 23 and elongated lever 27 will be restored by spring 26 and the release lever 5 is returned to its original position by hair pin spring 17.

(2) *Single frame exposure.*—Figure 2 shows this case, and switch lever 31 is in its lifted, single frame exposure position, as shown in the drawing. Elongated lever 27 is guided by boss 33 of switch lever 31 and lower end 29 of the elongated lever comes directly above left hand end 21 of auxiliary lever 18. Now knurled end 7 may lift upwardly since lower end 29 of the elongated lever clears projection 22 of the release lever. Upon such lifting of release lever 5, pin 19 of auxiliary lever 18 is lifted by the walls defining aperture 20, and the left hand end 21 of lever 18 turns counterclockwise about its pivot shaft 16 to clear the lower end of elongated lever 27. Thus stop 11 disengages from projection 9, and after shutter sector 2 has rotated substantially one rotation the other projection 10 engages with stop 11. When the release lever is lowered into its rest position shown in Figure 2, stop 11 engages with projection 9 immediately after stop 11 disengages from projection 10, thus not allowing shutter sector 2 to rotate.

When the cable release in member 36 is operated, auxiliary lever 18 swings counter-clockwise around stub shaft 16, thereby aperture 20 moves upwardly by means of pin 19. Thus release lever 5 will swing clockwise around its pivot 6 and make a single frame exposure as in the above mentioned case of manual single frame shooting.

The device according to my invention comprises but relatively few elements but in practical use operates remarkably. The arrangement of switch lever 31, segment 23, elongated lever 27, guide pin 30, and auxiliary lever 18 enables use of a cable release in both single frame and continuous exposure. Further such arrangement prevents some erroneous operation, such as experienced in single frame exposure as described in the introductory portion of this specification.

What I claim is:

A shutter release for motion picture cameras comprising a rotatable sector shutter having a first and a second projection, a shutter release lever pivoted to the camera frame with its free end projecting outside the camera housing for manually swinging the release lever selectively upward and downward, the release lever having a transversely elongated aperture at substantially its mid-length region and a longitudinally elongated aperture in its region between the transversely elongated aperture and its pivoted end, a formed ear on the release lever, a projection integral with the release lever near the free end thereof, a stub shaft secured in the camera frame and projecting through the transversely elongated aperture, an auxiliary lever pivoted on the stub shaft, a pin on a free end of the auxiliary lever extending into the longitudinally elongated aperture, a bent ear formed on the release lever adjacent the stub shaft, a hair pin type spring on the camera frame embracing between its tines both the stub shaft and the bent ear, a stop on the release lever for engaging the shutter first projection in the normal position of the lever for continuous exposure and for engaging the shutter second projection when the release lever free end is lifted for single frame exposure, a switch lever pivoted on the camera frame, a boss integral with the switch lever, a spring-pressed self-restoring rotatable segment pivoted on the frame, a bent-over end portion on the segment, a threaded bushing in the camera frame for attaching a cable release, the bushing being aligned with the bent-over portion with the segment in its restored position, an elongated lever pivoted at an end region on the segment and extending to the release lever projection, a guide pin fixed in the camera frame, and a spring pressing the elongated lever against the guide pin and in the direction of the boss such that with the free end of the switch lever in its lower position the free end of the elongated lever is aligned with the projection of the release lever and the free end region of the release lever may be selectively lowered from the normal position manually and by actuation of the cable release to the continuous exposure position and can be lifted up to the single frame exposure position only by actuation of the cable release, while with the free end of the switch lever in its upper position the boss deflects the elongated lever to engage the free end of the auxiliary lever to prevent continuous exposure as long as the free end of the switch lever remains in its upper position and permits only single frame exposure.

References Cited in the file of this patent

UNITED STATES PATENTS

| | | |
|---|---|---|
| 2,462,302 | Bolsey | Feb. 22, 1949 |
| 2,472,299 | Jerome | June 7, 1949 |

FOREIGN PATENTS

| | | |
|---|---|---|
| 813,651 | France | Mar. 1, 1937 |